US008222993B2

(12) United States Patent
Bliding et al.

(10) Patent No.: US 8,222,993 B2
(45) Date of Patent: Jul. 17, 2012

(54) LOCK ACTUATING DEVICE FOR A LOCK MECHANISM OF A LOCK, AND A METHOD OF PROVIDING WIRELESS CONTROL OF A LOCK

(75) Inventors: Olle Bliding, Halmstad (SE); Johan Hörberg, Halmstad (SE)

(73) Assignee: Phoniro AB, Halmstad (SE)

( * ) Notice: Subject to any disclaimer, the term of this patent is extended or adjusted under 35 U.S.C. 154(b) by 0 days.

(21) Appl. No.: 12/659,056

(22) Filed: Feb. 24, 2010

(65) Prior Publication Data

US 2010/0148921 A1 Jun. 17, 2010

Related U.S. Application Data

(63) Continuation of application No. 11/886,527, filed as application No. PCT/SE2006/000345 on Mar. 17, 2006.

(30) Foreign Application Priority Data

Mar. 18, 2005 (SE) ....................................... 0500616

(51) Int. Cl.
*B60R 25/00* (2006.01)

(52) U.S. Cl. ..... 340/5.7; 340/5.61; 340/10.1; 340/10.33

(58) Field of Classification Search ................. 340/5.72, 340/5.61, 572.1–572.8, 10.1, 10.3, 5.7–5.73, 340/10.33

See application file for complete search history.

(56) References Cited

U.S. PATENT DOCUMENTS 4,197,524 A 4/1980 Salem
4,763,121 A * 8/1988 Tomoda et al. .............. 340/5.61
5,276,444 A 1/1994 McNair
5,838,257 A * 11/1998 Lambropoulos ............. 340/5.61
5,973,611 A 10/1999 Kulha et al.
6,317,025 B1 11/2001 Leon et al.
6,912,287 B1 6/2005 Fukumoto et al.

(Continued)

FOREIGN PATENT DOCUMENTS

EP 0735219 * 10/1996

(Continued)

OTHER PUBLICATIONS

U.S. Office Action mailed Jun. 11, 2010 for corresponding U.S. Appl. No. 11/723,088.

(Continued)

*Primary Examiner* — Benjamin C Lee
*Assistant Examiner* — Peter Mehravari
(74) *Attorney, Agent, or Firm* — Harness, Dickey & Pierce, P.L.C.

(57) ABSTRACT

In one embodiment of the present invention, a lock actuating device for a lock mechanism of a lock has a transceiver capable of interaction with a wireless key device, a controller coupled to the transceiver and capable of generating a control signal, and a lock actuator adapted for actuation of the lock mechanism upon receipt of the control signal from the controller. The controller has a sleep mode and an operational mode. The lock actuating device also has a wake-up arrangement including a sensor and associated circuitry. The sensor is positioned to detect the presence of a user in a vicinity of the lock actuating device. The circuitry is adapted to generate a wake-up control signal to the controller upon detection of the user, so as to cause the controller to switch from sleep mode to operational mode.

19 Claims, 5 Drawing Sheets

U.S. PATENT DOCUMENTS

| | | | | |
|---|---|---|---|---|
| 6,992,562 | B2 | 1/2006 | Fuks et al. | |
| 2002/0183008 | A1 | 12/2002 | Menard et al. | |
| 2003/0043021 | A1 | 3/2003 | Chung | |
| 2004/0066092 | A1* | 4/2004 | Muller | 307/10.1 |
| 2004/0201277 | A1 | 10/2004 | Hentsch et al. | |
| 2004/0257209 | A1 | 12/2004 | Yang et al. | |
| 2005/0210283 | A1 | 9/2005 | Kato | |

FOREIGN PATENT DOCUMENTS

| | | |
|---|---|---|
| EP | 1 169 843 | 1/2002 |
| EP | 1 450 312 | 8/2004 |
| EP | 0 735 219 | 2/2006 |
| WO | WO 98/39539 | 9/1998 |
| WO | WO 01/63425 A1 | 8/2001 |
| WO | WO 02/31778 | 4/2002 |
| WO | WO 02/095689 | 11/2002 |
| WO | WO 03/081787 | 10/2003 |

OTHER PUBLICATIONS

Office Action for corresponding European application dated Oct. 12, 2009.

Office Action for divisional of corresponding European application dated Oct. 26. 2009.

Office Action for related U.S. Appl. No. 11/886,527 dated Oct. 6, 2010.

Office Action for related U.S. Appl. No. 11/723,088 dated Oct. 14, 2010.

Office Action for corresponding European patent application No. 09 160 419.9 dated Oct. 28, 2011.

Extended Search Report for corresponding European patent application No. 11188465.6 dated Mar. 29, 2012.

* cited by examiner

LOCK ACTUATING DEVICE FOR A LOCK MECHANISM OF A LOCK, AND A METHOD OF PROVIDING WIRELESS CONTROL OF A LOCK

PRIORITY STATEMENT

The present application is a continuation and claims priority under 35 USC §120 of pending prior U.S. application Ser. No. 11/886,527 filed on Sep. 17, 2007, which is the national phase under 35 U.S.C. §371 of PCT International Application No. PCT/SE2006/000345 which has an International filing date of Mar. 17, 2006, which designates the United States of America, and which claims priority on Swedish patent application number SE 0500616-8 filed Mar. 18, 2005, the entire contents of each of which are hereby incorporated herein by reference.

TECHNICAL FIELD

The present invention generally relates to access control, and more specifically to a lock actuating device for a lock mechanism of a lock. The invention also relates to a method of providing wireless control of a lock.

BACKGROUND OF THE INVENTION

The most common way to lock and unlock an access-controlling object such as a door is probably by using a mechanical key. This solution is cost efficient and easy to use, and a sophisticated mechanical lock is hard to force. However, there are two drawbacks with this solution: the user always has to bring the key and the key does not have any restrictions, i.e. it always works.

These drawbacks might seem like minor disadvantages, which might be true in situations with one user and one door, but in situations with a large number of users and a large number of doors the drawbacks are of considerable importance. In more particular, if a large number of users must have access to a large number of doors, a large number of keys has to be made for the different doors. This is not only unhandy but also a considerable security risk and costly.

Firstly, in order to reduce the security risk, some sort of key administration is necessary. This type of administration is costly.

Secondly, a user who receives a key might abuse it, and even if the user is a responsible person, the key might be stolen or lost. Since there are no built-in restrictions in a mechanical key the security risk becomes significant. Consequently, handing out a large number of keys is a security risk.

Thirdly, if one of the keys is lost or stolen the corresponding lock has to be substituted, as well as all the other corresponding keys, in order to maintain the security. The administration costs, locksmith costs and all interruptions due to these key substitutions imply considerable costs for a lost key.

A mechanical key system is hence not suitable for situations with a large number of users and a large number of doors. An example of such a situation is the elderly home care, where the domestic help personnel has a key to each of the caretakers. In order to solve this problem another type of locking system is necessary.

In WO 02/31778 A1 a wireless lock system is presented. When the lock of the system detects a nearby electronic key carried by a user, a random signal is generated. The key encrypts the signal and returns it to the lock. The lock decrypts the signal and compares it to the original to determine if the lock should be unlocked.

In order to function, the wireless lock system mentioned above must always establish a two-way wireless communication link between the key and the lock. This is a drawback, since the establishment of a two-way communication link is not made instantly. Hence, a user has to wait for a period of time until the establishment of the two-way communication link is completed, and thereafter the user has to wait until the comparison is completed. The present inventors have realized that if the wireless lock system in WO 02/31778 A1 is to be implemented with the de facto standard for short-range wireless data communication for mobile devices, namely RF communication in accordance with the Bluetooth™ standard on e.g. the 2.45 GHz ISM band, one must expect at least about 10 seconds, and possibly up to as much as 30 seconds, for the establishment of the two-way Bluetooth™ link alone; to this one must add the time required for performing the data exchange and comparison. Another drawback with the approach described in WO 02/31778 A1 is that the key will have to be implemented as a rather advanced, programmable wireless communication device, such as a high-end mobile telephone.

Users who are used to mechanical keys are not used to wait at the door, which will make the aforementioned waiting period into a source of irritation. In addition, if a large number of doors is to be opened every day the unlocking process must be smooth and easy.

Hence, it must be regarded as a qualified technical problem to reduce the time that lapses from the lock's detection of a nearby electronic key until the unlocking of the lock, or more particularly the delay that a user may experience waiting in front of the lock for it to unlock.

A natural way for the skilled person to solve this problem would be to increase the transmission power of the Bluetooth™ transceivers in the lock and key, since this would broaden the operating range thereof and allow earlier detection of an approaching key by the lock (such that the key will be detected already when the approaching user is at e.g. a 20 meter distance from the lock instead of e.g. a 10 meter distance), wherein the two-way link establishment may be initiated sooner and possibly be completed at the time when the user has reached the lock.

However, this solution has two pronounced drawbacks. First of all, the increased transmission power has an immediate penalty in the form of an increase in electric power consumption, which is particularly disadvantageous for battery-powered locks and keys. Secondly, the broadened operating range invites also other locks than the intended one to detect and interact with the key—in other words, the risk of cross-talk is increased.

In summary, there is a need for a flexible lock system arranged to work in situations with many users and many doors, and with a faster unlocking process.

SUMMARY OF THE INVENTION

In view of the above, an objective of the invention is to solve or at least reduce one or more of the problems discussed above.

This is generally achieved by the attached independent patent claims.

A first aspect of the invention is a lock actuating device for a lock mechanism of a lock, the lock actuating device comprising:

a transceiver capable of interaction with a wireless key device, a controller coupled to the transceiver and capable of generating a control signal, and a lock actuator adapted for actuation of the lock mechanism upon receipt of the control signal from the controller.

The controller has a sleep mode and an operational mode.

The lock actuating device further comprises a wake-up arrangement including a sensor and associated circuitry, the sensor being positioned to detect the presence of a user in a vicinity of the lock actuating device, and the circuitry being adapted to generate a wake-up control signal to the controller upon detection of said user, so as to cause the controller to switch from sleep mode to operational mode.

A second aspect of the invention is a method of providing wireless control of a lock, the method involving:

providing a battery-powered, wirelessly controllable lock device as a stand-alone installation at a lock;

operating said lock device in a sleep mode with negligible power consumption during periods of inactivity;

detecting the presence of a user in a vicinity of said lock device;

in response to said detecting, exiting the sleep mode and entering an operational mode for said lock device; and in said operational mode, interacting with a wireless key device within operative range of said lock device to cause unlocking of said lock.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objectives, features and advantages of the present invention, will be better understood through the following illustrative and non-limiting detailed description of embodiments of the present invention, with reference to the appended drawings, where the same reference numerals will be used for similar elements.

DETAILED DESCRIPTION OF EMBODIMENTS

Figure 1:
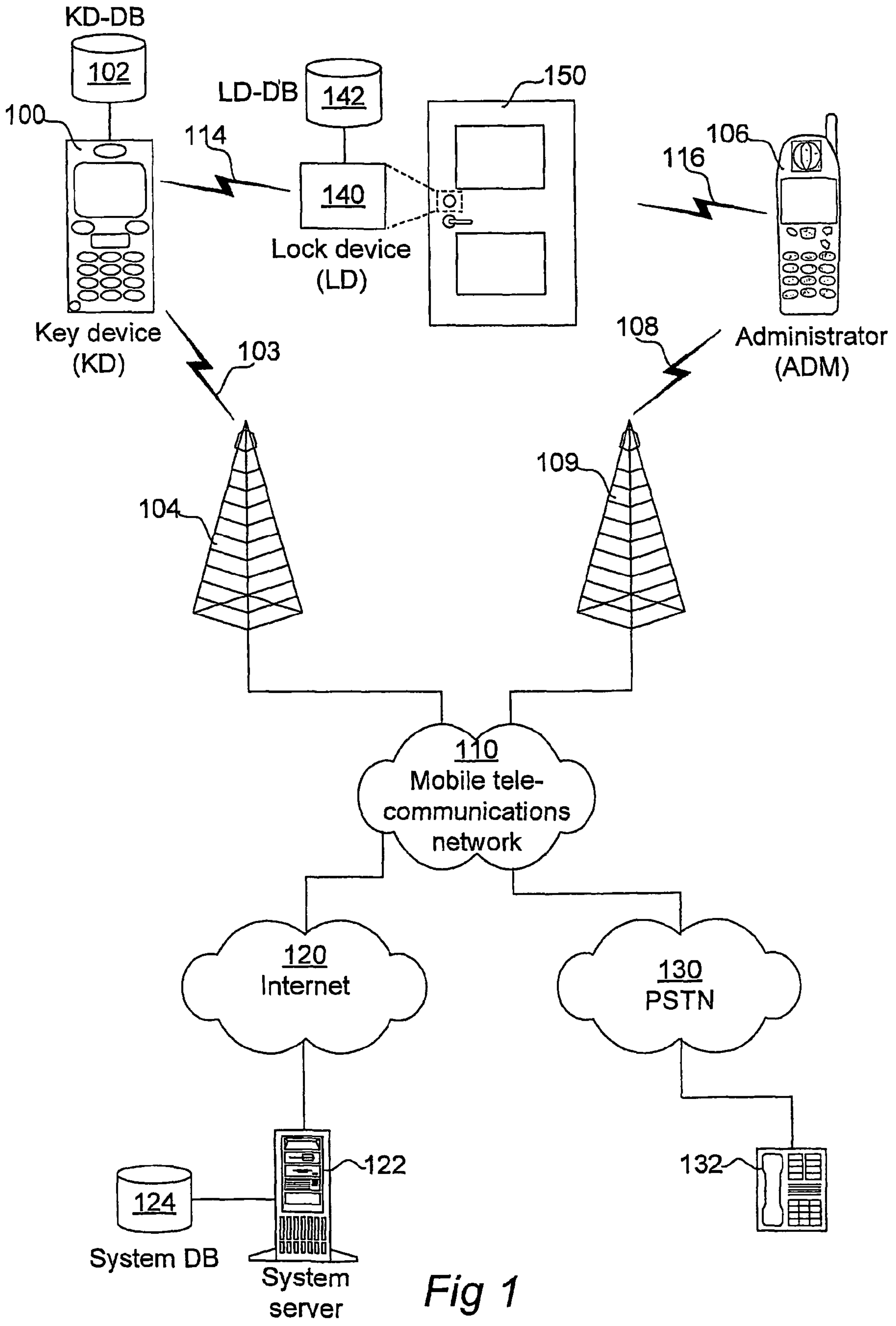
FIG. 1 is a schematic illustration of a telecommunication system, including a wireless key device implemented by a mobile terminal, an embodiment of a wireless lock device for a lock in a door, a wireless administrator device implemented by a mobile terminal, an administrator server, a mobile telecommunications network and a couple of other elements, as an example of an environment in which the present invention may be applied.

The present invention is advantageously implemented in a mobile telecommunications system, one example of which is illustrated in FIG. 1. Central elements in FIG. 1 are a wireless key device (KD) 100 and a wireless lock device (LD) 140. The purpose of the lock device 140 is to control some sort of lock mechanism in a lock, which in the illustrated example is a door lock on a door 150. In turn, the lock device 140 is operated by the key device when brought in the vicinity of the lock device. In more particular, both the key device 100 and the lock device 140 are enabled for short-range wireless data communication in compliance with a communication standard. In the preferred embodiment, this communication standard is Bluetooth™. Having been the de facto standard for short-range wireless data communication for mobile devices during several years already, Bluetooth™ is believed to be very well known to the skilled person, and no particulars about Bluetooth™ as such are consequently given herein.

As with most other contemporary mobile telecommunications systems, the system of FIG. 1 provides various telecommunications services such as voice calls, data calls, facsimile transmissions, music transmissions, still image transmissions, video transmissions, electronic message transmissions and electronic commerce for mobile terminals in the system, such as aforementioned mobile terminal 100, another mobile terminal 106, personal digital assistants (PDA) or portable computers. It is to be noticed that these various telecommunications services are not central to the invention, and for different embodiments, different ones of the telecommunications services may or may not be available.

Figure 2:
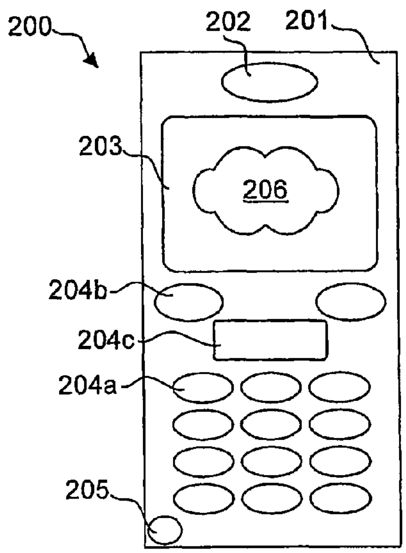
FIG. 2 is a schematic front view illustrating the wireless key device of FIG. 1, and in particular some external components that are part of a user interface towards a user of the wireless key device.

In FIG. 1, the key device 100 is implemented by any commercially available, Bluetooth™-enabled mobile terminal 100, one embodiment 200 of which is shown in FIG. 2. As seen in FIG. 2, and as is well known in the art, the mobile terminal 200 comprises an apparatus housing 201, a loudspeaker 202, a display 203, an input device 204*a-c*, and a microphone 205. In the disclosed embodiment, the input device 204*a-c* includes a set of keys 204*a* arranged in a keypad of common ITU-T type (alpha-numerical keypad), a pair of soft keys or function keys 204*b*, and a biometrical data reader 204*c* in the form of a fingerprint sensor. Hence, a graphical user interface 206 is provided, which may be used by a user of the mobile terminal 200 to control the terminal's functionality and get access to any of the telecommunications services referred to above, or to any other software application executing in the mobile terminal. With particular reference to one embodiment of the present invention, the keypad 204*a* may be used for entering a PIN code to be used for authenticating the key device 100 in the lock device 140 in order to decide whether or not to unlock the lock controlled by the lock device. In another embodiment, the biometrical data reader 204*c* is used correspondingly to produce a digital fingerprint sample from the user, said fingerprint sample being used for authenticating the key device 100 in the lock device 140 by matching with prestored fingerprint templates.

In addition, but not shown in FIG. 2, the mobile terminal 200 of course comprises various internal hardware and software components, such as a main controller (implemented e.g. by any commercially available Central Processing Unit (CPU), Digital Signal Processor (DSP) or any other electronic programmable logic device); associated memory, such as RAM memory, ROM memory, EEPROM memory, flash memory, hard disk, or any combination thereof; various software stored in the memory, such as a real-time operating system, a man-machine or user interface, device drivers, and one or more various software applications, such as a telephone call application, a contacts application, a messaging application, a calendar application, a control panel application, a camera application, a mediaplayer, a video game, a notepad application, etc; various I/O devices other than the ones shown in FIG. 2, such as a vibrator, a ringtone generator, an LED indicator, volume controls, etc; an RF interface including an internal or external antenna as well as appropriate radio circuitry for establishing and maintaining an RF link to a base station; aforementioned Bluetooth™ interface including a Bluetooth™ transceiver; other wireless interfaces such as WLAN, HomeRF or IrDA; and a SIM card with an associated reader.

The mobile terminals 100, 106 are connected to a mobile telecommunications network 110 through RF links 103, 108 via base stations 104, 109. The mobile telecommunications network 110 may be in compliance with any commercially available mobile telecommunications standard, such as GSM, UMTS, D-AMPS or CDMA2000.

The mobile telecommunications network 110 is operatively connected to a wide area network 120, which may be Internet or a part thereof. Various client computers and server computers, including a system server 122, may be connected to the wide area network 120.

A public switched telephone network (PSTN) 130 is connected to the mobile telecommunications network 110 in a familiar manner. Various telephone terminals, including a stationary telephone 132, may be connected to the PSTN 130.

Figure 3:
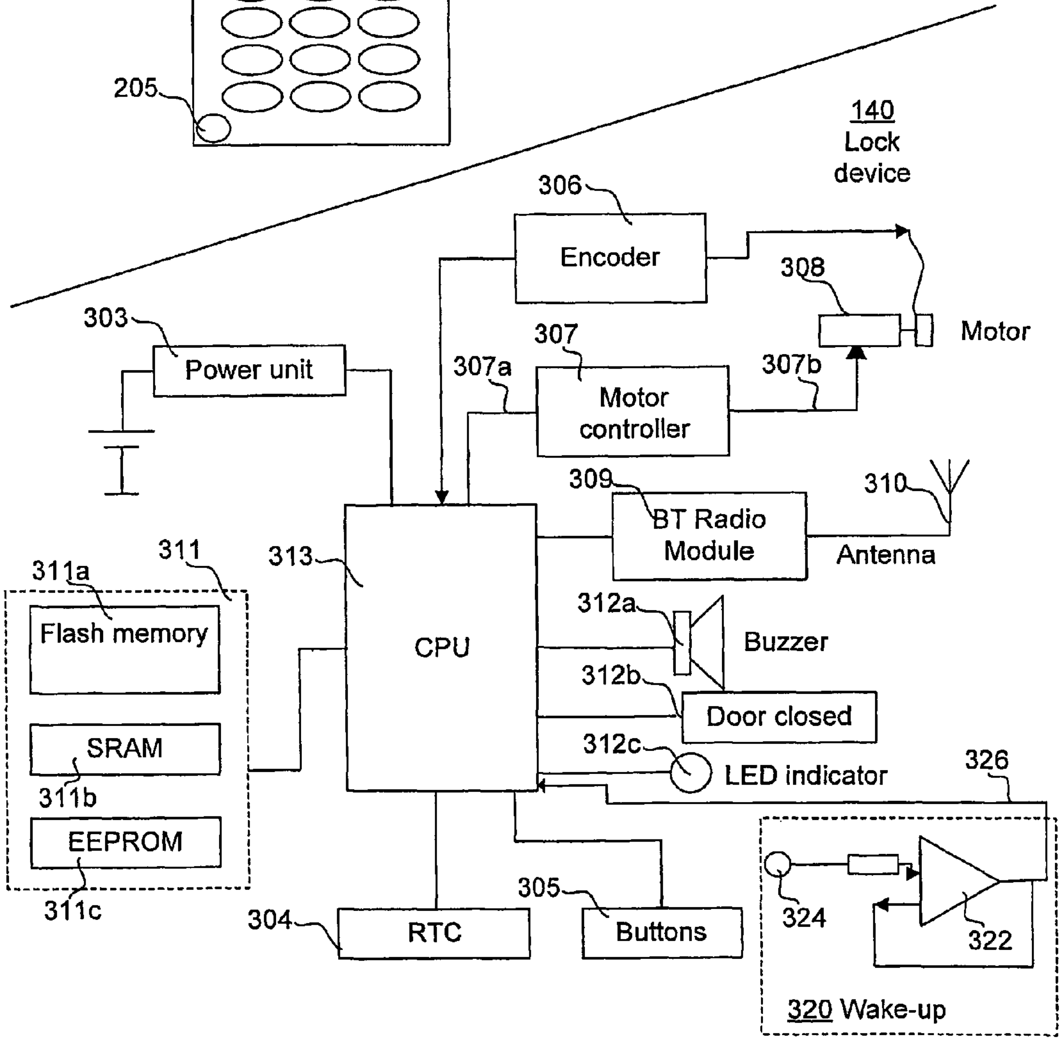
FIG. 3 is a schematic block diagram illustrating internal components and modules of the embodiment of the wireless lock device shown in FIG. 1.
Figure 4:
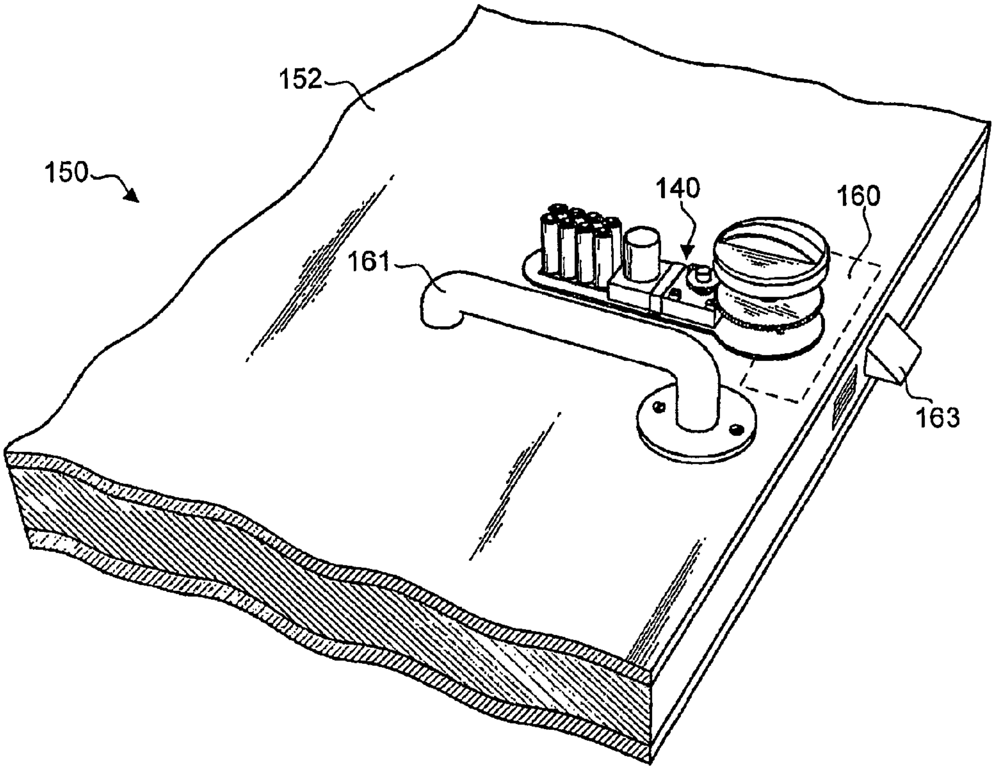
FIG. 4 is a perspective sectional view of the lock device of FIG. 1, mounted to the door of FIG. 1.
Figure 5:
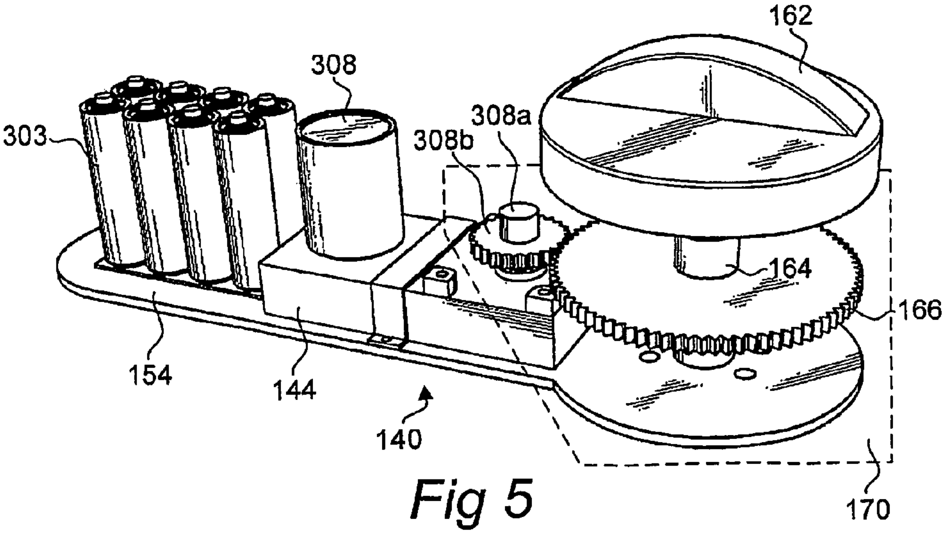
FIG. 5 is a perspective and exploded view of the lock device of FIG. 4.

Referring now to FIGS. 3-5, the lock device 140 will be described in more detail. In FIG. 4, the door 150 is shown in more detail. In a well-known manner the door has a lock 160 which includes an internal lock mechanism and which is only schematically indicated in FIG. 4. A door handle 161, a lock knob 162 and a lock catch 163 are also provided. The lock knob 162 is mounted to one end of a rotatable axle 164 which is coupled to or engages with the internal lock mechanism of the lock 160. The lock device 140 is mounted to a base plate 154 which is attached to the door leaf 152 next to the lock 160.

A user may manually unlock the door lock 160, from the inside of the premises which are protected by the door 150, by turning the lock knob 162. This will cause rotation of the axle 164, actuation of the internal lock mechanism of the lock 160, and, ultimately, retraction of the lock catch 163 from its extended locking position in FIG. 4 to a retracted releasing position.

In addition to this, and in accordance with the invention, the door lock 160 may also be automatically unlocked by the lock device 140 by the following arrangements. To this end, a first gear wheel 166 is provided for actuation of the rotatable axle 164 via disengageable carrier means (not shown in FIG. 5). The first gear wheel 166 engages with a second, smaller gear wheel 308*b* which in turn is fixedly mounted to a rotatable axle 308*a* of an electric motor 308 inside a protective casing 144 of the lock device 140. A motor controller 307 (FIG. 3) is coupled to the motor 308 and is adapted to provide a control signal 307*b* for engaging or disengaging the motor 308 and the aforementioned carrier means.

In turn, the motor controller 307 is controlled by a control signal 307*a* from a CPU 313 in the lock device 140. An encoder 306 is provided to assist the CPU 313 in monitoring the current angular position of the gear wheel 166 so as to select appropriate duration of the control signal 307*a* and achieve sufficient retraction of the lock catch 163 by the mechanical power provided by the motor 308 and translated into turning of the rotatable axle 164 via the first and second gear wheels 166, 308*b* and the carrier means. Thus, these elements form a lock actuator 170 which is controllable by the motor controller 307 and CPU 313.

Figure 6:
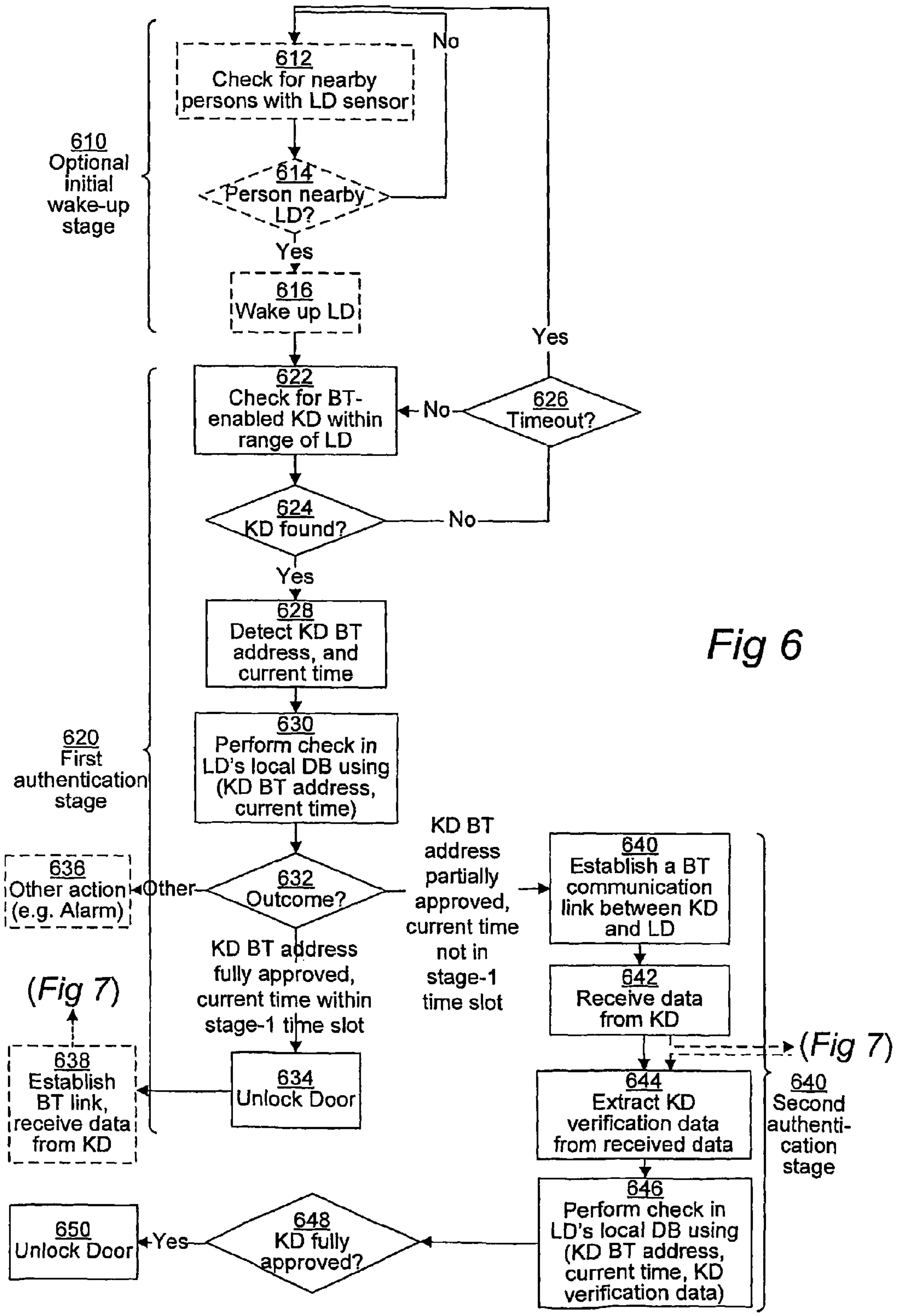
FIGS. 6 and 7 are flowchart diagrams of a method performed by the lock device for unlocking the lock by actuating a lock mechanism thereof.
Figure 7:
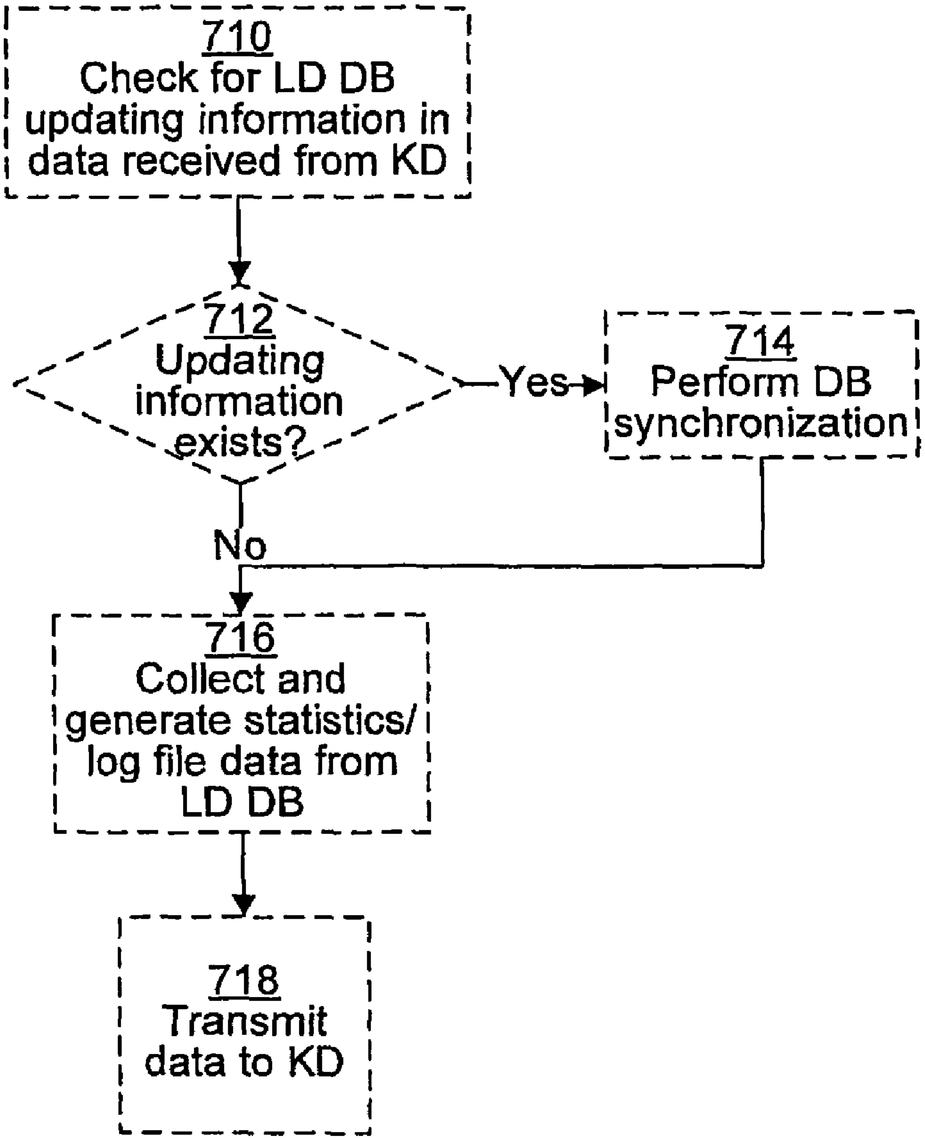

The CPU 313 is programmed to read and execute program instructions stored in a memory 311 so as to perform a method for wireless automatic unlocking of the lock 160 in response to the appearance and proper authentication of the key device 100. An embodiment of this method is illustrated in FIGS. 6 and 7 and will be described in more detail later.

The lock device 140 is a stand-alone, autonomously operating device which requires no wire-based installations, neither for communication nor for power supply. Instead, the lock device 140 is powered solely by a local battery power unit 303 and interacts with the key device, as already mentioned, by Bluetooth™-based activities. To this end, the lock device 140 has a Bluetooth™ radio module 309 with an antenna 310.

The lock device 140 of the present embodiment further includes a real-time clock 304 capable of providing the CPU 313 which an accurate value of the current time. A detector 312*b* is positioned to detect that the door 150 is in a properly closed position, so that the CPU 313 may command locking of the lock 160 a certain time after a user has opened the door through the key device 100 and passed therethrough. The detector 312*b* may be a conventional magnetic switch having a small magnet mounted to the door frame and a magnetic sensor mounted at a corresponding position on the door leaf 152.

At the same time, preferably, the carrier means is disengaged, so that the lock knob 162 may be actuated manually from the inside of the premises to lock or unlock the door lock 160 without mechanical resistance from the electromechanical elements of the lock actuator 170. In an alternative embodiment, these elements may be replaced by an electric step motor positioned and adapted to actuate the axle 164 directly. Thus, in such an embodiment, on condition that the electric step motor provides only little mechanical resistance, the aforesaid carrier means may be dispensed with.

The lock device 140 may have a simple user interface involving button(s) 305, a buzzer 312*a* and LED indicator(s) 312*c*. In some embodiments, an authorized administrator (ADM) may configure the lock device 140 through this user interface. In other embodiments, though, configuration of the lock device 140—including updating the contents of a local database (LD-DB) 142 stored in memory 311 and containing i.a. key device authentication data—occurs wirelessly either directly from a proximate mobile terminal 106 over a Bluetooth™ link 116, or by supplying a key device, for instance key device 100, with authentication data updating information from a system database 124 at the system server 122 over the mobile telecommunications network 110.

Since the lock device 140 is a stand-alone, battery-powered installation which is intended to be operative for long time periods without maintenance, it is important to keep power consumption at a minimum. Therefore, the present embodiment is designed to put itself in a sleep mode after a certain period of inactivity. In the sleep mode, the elements of the lock device 140 are inactive and consume negligible power. The way to exit the sleep mode and enter operational mode is by applying a wake-up control signal 326 on a particular control input on the CPU 313. To this end, the lock device 140 is provided with a wake-up arrangement 320 having a proximity sensor 324 and associated circuitry 322.

The proximity sensor 324 is positioned to detect the presence of a user in a vicinity of the lock device 140, and in response the circuitry 322 is adapted to generate the wake-up control signal 326. The proximity sensor 324 may for instance be an IR (Infra-Red) sensor, an ultra-sound sensor, an optical sensor, an RF (Radio Frequency) sensor or a pressure sensor. Such types of sensors are all well known to the skilled person and are commercially available. For instance, when the proximity sensor 324 is an RF sensor, it may advantageously be adapted to detect mobile telecommunications traffic, such as GSM traffic, to or from the mobile terminal which implements the key device 100. Thus, in this case the proximity sensor 324 does not detect the user himself but the key device 100 he carries. When the proximity sensor 324 is a pressure sensor, it may advantageously be located at floor level somewhere near the door 150, so as to detect pressure variations caused by the user when stepping on the floor.

Alternatively, the proximity sensor 324 may be positioned on or at the door handle 161 and be adapted to generate a detection signal by electrically detecting interaction from the user on the door handle, for instance by capacitive means or by detecting the closure of an electric circuit.

In one embodiment, the wake-up arrangement 320 has an acoustic or vibration sensor 324 which is adapted to detect door knocks on the door leaf 152. Such a sensor may be provided in the form of a microphone which is attached via a spacer to the door leaf 152. The spacer will transfer vibrations caused by door knocks to the microphone. The circuitry 322 may be programmed or designed to apply predetermined wake-up criteria when decided whether or not to generate the wake-up control signal 326. Such wake-up criteria may for instance be the detection of more than one door knock within a certain time frame. This may prevent an accidental wake-up because of a spurious detection of a non-related sound from the environment. Even more advanced wake-up criteria may be used, such as a given sequence of short and long door knocks, much like a code of Morse signals.

In one embodiment, a door bell device is integrated with the lock device 140. Making use of the real-time clock 304, the CPU 313 may determine whether or not an acoustic door bell sound is to be generated (for instance during morning, day and evening times) or not (for instance during night time) when a door bell button of the door bell device is pressed. In addition, the door bell device may be used as the sensor 324 of the wake-up arrangement 320, such that an input signal is supplied to the circuitry 322 when the door bell button is pressed. It is alternatively possible to let the door bell device replace the entire circuitry 322, such that the wake-up control signal 326 is generated directly from a door bell button switch.

Additionally, means such as a depressible button may be provided on or at the door 150 on the inside of the premises in question. The user may avail himself of such means to cause forced unlocking of the door lock 160 when he desires to leave the premises. To this end, such means will be coupled to the CPU 313, and the latter will be adapted to perform the forced unlocking of the door lock 160 by generating the control signal **307*b* to the motor controller 307 so as to control the motor 308** in the manner previously described.

Referring now to FIGS. 6 and 7, an operational method performed by the lock device 140 for wireless automatic unlocking of the lock 160 will now be described in detail.

On a general level, the method consists of two main authentication stages 620 and 640, and, in the present embodiment but optionally, an initial wake-up stage 610. The first authentication stage 620 is designed to be fast and therefore does not involve any establishment of a two-way Bluetooth™ communication link between lock device and key device, in contrast to the prior art approach described in the introductory section of this document. Experiments have indicated that the first authentication stage, resulting in the opening of a door, may be completed in as little time as 2-4 seconds, which is considerably faster than in the prior art.

In the first authentication stage, authorization is based solely on the key device's Bluetooth™ address and the current time, both of which are detected automatically by the lock device 140 and require no interaction from the user (other than bringing the key device 100 near the door 150). Certain prioritized users are entrusted to unlock the door 150 simply through this first authentication stage 620, whereas other users must be authorized during the following, second and more extensive authentication stage 640 which requires establishment of a two-way Bluetooth™ communication link and involves additional verification data from the key device 100—in the form of a PIN code in the present embodiment.

The lock device 140 bases its operation upon the authentication data stored in LD-DB 142. In the present embodiment, the record structure of the LD-DB 142 includes the following data fields for authentication data:

| Field | Contents example #1 | Contents example #1 |
|---|---|---|
| LD ID | 121 | 121 |
| User name | Olle | Johan |
| Bluetooth ™ ID | 0x00223af3 | 0x002e5af4 |
| Stage-1 time slot (1) | 2005-03-24: 19-22 | |
| Stage-1 time slot (2) | Mon-Fri: 07-15 | |
| . . . | | |
| Stage-1 time slot (n) | | |
| Stage-2 time slot - single | | |
| Stage-2 time slot - scheduled | 00-24 | Sat-Sun: 10-18 |
| PIN code | **** | **** |
| Administrator | No | No |

In the example given above, it is thus configured that user Olle is authorized to open the door 150, through the lock device 140 having ID 121, by using his key device 100 having Bluetooth™ ID 0x00223af3 by fast stage-1 authentication during working days between 07:00 and 15:00. He is also granted a temporary stage-1 authority on 24 Mar. 2005 between 19:00 and 22:00. If he arrives at the door outside of these stage-1 time slots, he may still access the door 150 at any time (00-24), but in such a case he must go through a more complex stage-2 authentication which involves additional authorization, namely by providing a PIN code from the key device 100 and having it communicated to the lock device 140 over a two-way Bluetooth™ communication link. Stage-2 authentication requires a special software in the key device 100, since data exchange is involved. Therefore, if mobile terminals are used as key devices, they are preferably of an advanced model provided with a suitable operating system, such as Symbian, at least for users that require stage-2 authentication. As regards the PIN code, it may either be prestored in memory in the key device 100 and fetched by the software therein upon communication to the lock device, or the software may invite the user to enter his PIN code manually on e.g. the keypad **204*a* upon establishment of the two-way Bluetooth™ communication link. In other embodiments, if biometric data instead of PIN code is used as verification data, they are treated in the corresponding way, i.e. either prestored in memory or read by e.g. the fingerprint sensor 204*c***. It is to be observed that all communication between key device and lock device is encrypted in accordance with an encryption algorithm, such as Blowfish. Therefore, data integrity is ascertained.

As for user Johan, only stage 2-authentication is available to him, and only on weekends between 10:00 and 18:00.

With reference to FIG. 6, assuming that the lock device 140 is in sleep mode, the initial wake-up stage 610 is performed in steps 612, 614 and 616 by using the proximity sensor 324 to detect the presence of the user of key device 100 near the lock device 140 and in response generate the wake-up control signal 326 to the CPU 313.

This causes the CPU 313 to enter the first authentication stage 620. A step 622 searches for Bluetooth™-enabled devices by paging, i.e. sending inquiry requests at regular intervals. Each Bluetooth™-enabled device within operating range (i.e. within a radius of some meters from the lock device 140, depending on e.g. the output power of the Bluetooth™ radio module 309 and the performance of the Bluetooth™ transceivers in the devices paged for) will transmit an inquiry response to the lock device. It is checked in step 624 whether at least one inquiry response is received within a time limit; if not a time out 626 occurs and the lock device 140 returns to sleep mode.

If an inquiry response was received, step 628 proceeds to determine the Bluetooth™ address from the inquiry response. Moreover, a current time is determined by reading a value from the real-time clock 304.

Then, the CPU 313 proceeds in step 630 to check whether the determined Bluetooth™ address of the responding device matches one of aforedescribed authentication data records in the LD-DB 142. In case of a match, it is also checked whether the current time falls within any stage-1 time slot defined for that Bluetooth™ address. If the outcome of these checks is fully positive, as checked in step 632, the CPU 313 proceeds to step 634 and generates the control signal 307*a* to the motor controller 307. As described above, this will cause unlocking of the door lock 160 and allow the door 150 to be opened.

If the check in step 632 reveals that the determined Bluetooth™ address is not present in the LD-DB 142, or that the Bluetooth™ address is present but the current time matches neither a stage-1 time slot nor a stage-2 time slot for that address, then the door lock 160 will not be unlocked, and the execution will return to step 622. In some embodiments it is possible to list certain undesired Bluetooth™ addresses as explicitly forbidden in LD-DB 142. If the determined Bluetooth™ address matches such a forbidden Bluetooth™ address, appropriate action may be taken in a step 636, such as generating an alarm signal or registering the access attempt in memory 311 for later reporting.

If the check in step 632 reveals that the determined Bluetooth™ address is present in the LD-DB 142, but that the current time does not fall within any stage-1 time slot defined for that Bluetooth™ address but only within a stage-2 time slot, the execution proceeds to step 640.

In step 640, the CPU controls the Bluetooth™ radio module 309 to establish a two-way Bluetooth™ communication link with the key device 100 detected in step 628. In step 642, data transmitted by the software in the key device 100 is received in the lock device 140. Step 644 extracts verification data, such as a PIN code for key device 100, which as previously explained is included in the received data. Then, in step 646 it is checked whether the extracted verification data matches the corresponding authentication data stored for the key device's Bluetooth™ address in LD-DB 142. In case of a match, step 648, the CPU 313 proceeds to step 650 and generates the control signal 307*a* to the motor controller 307. Again, this will cause unlocking of the door lock 160 and allow the door 150 to be opened.

Once there is an established two-way Bluetooth™ communication link between key device 100 and lock device 140, i.e. upon completion of step 640, it is possible to use this link for exchanging also other kind of data than aforesaid verification data. As seen in FIG. 7, it may be checked in a step 710 whether the data received from the key device 100 contains authentication data updating information for the intention of updating the authentication data records stored in LD-DB 142, for instance in order to reflect the addition of a new user/key device at the system server 122, or a change in authority for an existing user—e.g. a change in its stage-1 or stage-2 time slot.

Such updating information may have been distributed to the key device 100, as well as to other key devices in the system, from the system server 122 over the mobile telecommunications network 110, for instance as an attachment in an MMS or email message. Updating information originating from the system server 122 (system DB 124) is encrypted before transmission to the key device 100 (if not already when stored in system DB 124), and upon reception the key device 100 stores the updating information as an encrypted dataset in local memory (KD-DB 102). Thus, the updating information is not decrypted by the key device 100, which prevents unauthorized manipulation of the information. For further data security, a system time stamp is preferably included in the updating information distributed from the system server 122, and the key device may store the updating information with a key device time stamp in its KD-DB 102, said key device time stamp representing the time of receipt of the updating information from the system server in the key device.

If updating information is found in step 712 to exist in the received data, the CPU 313 proceeds to step 714 so as to update the contents of the LD-DB with the updating information received from the key device 100. Before this is done, however, the CPU 313 preferably determines a time stamp of the received updating information, such as the aforementioned system time stamp and/or key device time stamp, and compares it or them to a cur-rent time stamp for the present authentication data in the LD-DB 142. Only if according to this comparison the updating information from the key device 100 is newer will the actual update in LD-DB 142 take place. For improved security, the CPU 313 may choose to allow updating of the LD-DB 142 only if the current time stamp of the LD-DB 142 is older than both the key device time stamp and the system time stamp, and if the key device time stamp is newer than the system time stamp.

Performing such updating of the LD-DB 142 prior to performing the authentication check of the key device 100 in step 646 allows the key device to bring about updating information that may actually change the outcome of its own authentication. For instance, if the key device 100 belongs to a new user which has not previously been represented in the LD-DB, it may nevertheless bring about updating information that will give itself stage-1 or stage-2 authority after the update of the LD-DB. A condition is, of course, that authentication data for that key device has been duly created by the administrator at the server 122 and has reached the key device 100 prior to the arrival thereof at the lock device 140. To this end, in some embodiments, step 632 will be followed by an attempt for stage-2 authentication in step 640, even if no matching Bluetooth™ address is found during stage-1 authentication.

Another optional step 716 involves compiling historic data about previous accesses to the door 150 through the lock device 140. Such historic data may have been created by the CPU 313 each time a key device has been subjected to authentication by the lock device 140 and may comprise the detected Bluetooth™ address of each such key device, and a time stamp representing the time it happened. Such historic data may be stored in an event register in the LD-DB 142. In step 716, a log file and/or statistics may be generated by reading the historic data from the event register. The log file and/or statistics is/are transmitted as a dataset to the key device 100 in step 718. Upon receipt thereof, the software in the key device 100 may store the dataset in its KD-DB 102 for immediate or later forwarding to the system server 122 over the mobile telecommunications network 110, essentially like the distribution of aforesaid updating information but in the reverse order and direction. In this way, at the system server the administrator may analyze such log file and/or statistics not only for the lock device 140 but also for other lock devices in the system, thereby being given an overview of the operational situation in the entire system.

In some embodiments, after a successful stage-1 unlocking in step 634, the execution may proceed to step 638, in which a two-way Bluetooth™ communication link is established, and then with the above-described steps of FIG. 7 so as to exchange authentication data updating information and/or statistics/log file data with the key device 100.

In an alternative embodiment, the lock device 140 is physically divided into two units. A first unit, capable of wireless communication such as Bluetooth™, is mounted at a nearby mains power socket to receive electric power therefrom. Thus, the first unit need not be optimized in terms of power consumption. The first unit is capable of performing the afore-described first and, if applicable, second authentication stages for an available key device and generate a control signal to a second unit, which will be mounted at the lock in question and cause unlocking of its lock mechanism upon receipt of a successful control signal from the first unit. Thus, the second unit will contain the electromechanical elements necessary to perform this task. The second unit is advantageously battery-powered and adapted to receive the control signal from the first unit over a wireless interface, such as Bluetooth™. Since power consumption is not an issue for the first unit, this may advantageously be adapted to scan continuously for key devices in the neighborhood, i.e. the wake-up arrangement described above may be dispensed with. This allows further miniaturization and simplification of the second unit. One first unit may be configured to handle and control several second units, each mounted at a respective door, window, etc—the first unit thereby functioning like a central locking device.

The key device 100 may contain software that requires the user to regularly enter a security code, such a PIN code at least once every hour. If no correct PIN code is entered in time, the key device 100 may be adapted to disable for instance its Bluetooth functionality. This will prevent misuse in case the key device 100 gets stolen or otherwise lost and minimizes the risk that an unauthorized individual gets access to the space or premises protected by the lock 160. For improved security, the software of the key device 100 may also be susceptible of an incoming disable command over the link 103, contained for instance in an SMS, MMS or email message from the system server 122, allowing the administrator of the server 122 to disable the key device 100 from remote if necessary.

The invention has mainly been described above with reference to a few embodiments. However, as is readily appreciated by a person skilled in the art, other embodiments than the ones disclosed above are equally possible within the scope of the invention, as defined by the appended patent claims. For instance, even if the disclosed embodiments relate to opening of doors, the invention may just as well be used for controlling other kind of objects, including but not limited to garage ports and various other equipment at homes, offices or public buildings. A medicine cabinet is one example of such an object that may be protected by the invention. Moreover, the invention may be used for wireless actuation of a safety lock of the well known "safety chain" type, i.e. a lock which has three primary positions: a locked position, an open or unlocked position, and a safety position in which the protected door, window, etc, can be opened only a short distance. One example of such a safety lock is found in WO 04/083576.

Further, even if the disclosed embodiments use Bluetooth™ for the short-range wireless data communication, another communication standard is also feasible, including but not limited to IrDA or a wireless local area network (WLAN) standard such as IEEE 802.11, IEEE 802.11a, IEEE 802.11b, IEEE 802.11g, HiperLAN2, WiMAX (IEEE 802.16), or HomeRF.

A further aspect of the invention is a method for unlocking a lock by a lock device enabled for short-range wireless data communication in compliance with a communication standard, the method comprising the steps of:

detecting a key device within operative range of the lock device;

determining a wireless communication address of the key device;

evaluating the determined key device address by reference to a data storage with a number of wireless communication addresses stored therein;

generating an evaluation result from said evaluating step c), wherein a match between the determined key device address and any of the wireless communication addresses stored in the data storage is a requisite for a positive evaluation result; and unlocking said lock if a positive evaluation result is generated in step d).

Steps a) and b) of detecting and determining are performed without any establishment of a two-way communication link between lock device and key device pursuant to said communication standard, and therefore the unlocking method according to the first aspect is much faster than the unlocking method known from the prior art previously referred to in this document. Moreover, it will allow also less advanced wireless communication devices to act as key devices.

The communication standard is preferably BlueTooth™, and steps a) and b) may thus involve:

paging for BlueTooth™ enabled devices within operative range by sending inquiry requests;

receiving an inquiry response from said key device; and obtaining said wireless communication address of said key device by reading its BlueTooth™ address from said inquiry response.

Step b) may further involve determining a current time; and steps c) and d) may further involve comparing said current time with a number of time slots associated with a particular one of the stored wireless communication addresses that matches the determined wireless communication address of the key device, a requisite for a positive evaluation result being that the current time falls within any of said time slots.

The wireless communication addresses stored in the data storage may be associated with respective authority levels, wherein steps c) and d) may involve:

for a particular one of the stored wireless communication addresses that matches the determined wireless communication address of the key device, generating a first evaluation result if an authority level associated with said particular address meets or exceeds a predetermined authority level, and otherwise generating a second evaluation result, wherein said first evaluation result corresponds to said positive evaluation result and causes performance of step e), and wherein said second evaluation result causes, instead of step e), performance of the following steps:

establishing a two-way communication link between said lock device and said key device pursuant to said communication standard;

receiving verification data from said key device over said communication link;

authenticating said key device by matching the received verification data with authentication data stored in said data storage and associated with said particular address; and upon successful authentication of said key device in step h), unlocking said lock.

This allows handling of certain prioritized and/or trusted users according to the fast unlocking method described earlier, whereas other users may be checked more carefully by retrieving their verification data over the two-way communication link for examination in the lock device.

Time slots are preferably provided in first and second types, said first type of time slot representing a first authority level which meets or exceeds said predetermined authority level, and said second type of time slot representing a second authority level which is below said predetermined authority level, the method involving the step of deciding that said authority level associated with said particular address is said first authority level if said current time falls within at least one time slot which is of said first type and is associated with said particular address.

The verification data may include a PIN (Personal Identification Number) code, or biometric data in the form of e.g. a digital fingerprint sample.

The method may further involve the introductory steps of detecting the presence of a user in a vicinity of said lock device and in response triggering performance of step a). This allows the lock device to rest in a sleep mode with negligible power consumption during periods of inactivity. Only elements that handle the detection of the user's presence will need to be active during such a sleep mode. In turn, such optimum power preservation allows implementing the lock device as a stand-alone device that may operate autonomously for long periods of time, powered by its own power source such as batteries.

The presence of the user may be detected by receiving a detection signal from a proximity sensor positioned and adapted to monitor the vicinity of said lock device. The proximity sensor may be selected from the group consisting of: an IR (Infra-Red) sensor, an ultra-sound sensor, an optical sensor, an RF (Radio Frequency) sensor, a pressure sensor, a capacitive sensor, an acoustic sensor or a vibration sensor. Alternatively, for embodiments where the lock device is mounted to a door having a door handle, the proximity sensor may be positioned on or at said door handle and be adapted to generate said detection signal by electrically detecting interaction from said user on said door handle.

A step of storing said wireless communication address, as determined in step b), in said data storage allows generation of a log file and/or statistics by collecting wireless communication addresses for different key devices as stored in the data storage; and transmission of said log file and/or statistics to said key device over said communication link.

The method may involve the steps of receiving authentication data updating information from said key device over the communication link established in step f);

determining a first time stamp in the authentication data updating information received, said first time stamp reflecting a time of origin for the authentication data updating information;

determining a second time stamp for the authentication data currently stored in the data storage in the lock device; and updating the authentication data currently stored in the data storage in the lock device with authentication data included in the authentication data updating information received, if said first time stamp is newer than said second time stamp.

Further steps may involve determining a third time stamp in the authentication data updating information received, wherein said third time stamp reflects a time of receipt of said authentication data updating information at said key device from a remote server, and wherein said first time stamp reflects a creation time of said authentication data updating information at said server; and performing said updating step only if said first time stamp is older than said third time stamp, and both of said first and third time stamps are newer than said second time stamp.

Still an aspect of the invention is a lock actuating device for a lock mechanism of a lock, the lock actuating device comprising:

a wireless transceiver, a controller capable of generating a control signal, a data storage associated with the controller, and a lock actuator adapted for actuation of the lock mechanism upon receipt of the control signal from the controller, wherein the controller is configured to detect a wireless communication address of a present key device and perform a first authorization by evaluating the detected wireless communication address for verification against data in said data storage, a possible first outcome of the first authorization representing full approval of said present key device and a possible second outcome of the first authorization representing less than full approval of said present key device, wherein the controller is further configured, for said first outcome of the first authorization, to generate said control signal to the lock actuator, and, for said second outcome of the first authorization, respectively, to perform a second authorization involving retrieving verification data from said key device over an established two-way communication link via said wireless transceiver and evaluating the verification data for verification against data in said data storage, a possible first outcome of the second authorization representing approval of said present key device, the controller being configured, for said first outcome of the second authorization, to generate said control signal to the lock actuator.

The lock actuating device may further comprise a real-time clock capable of providing the controller with a current time value, wherein the controller is configured, during the first authorization, to evaluate said current time value with respect to data in said data storage to determine whether said current time matches an allowable time period defined by said data for the wireless communication address of said present key device, a requisite for said possible first outcome being a match between said current time value and said allowable time period.

In one embodiment, the controller has a sleep mode and an operational mode, the lock actuating device further comprising a wake-up arrangement including a sensor and associated circuitry, the sensor being positioned to detect the presence of a user in a vicinity of the lock actuating device, and the circuitry being adapted to generate a wake-up control signal to the controller upon detection of said user, so as to cause the controller to switch from sleep mode to operational mode.

Yet another aspect of the invention is a lock device for unlocking a lock, the lock device having:

means for short-range wireless data communication device in compliance with a communication standard;

means for detecting a key device within operative range of the lock device;

means for determining a wireless communication address of the key device;

a data storage with a number of wireless communication addresses stored therein;

means for evaluating the determined key device address by referring to the number of wireless communication addresses stored in the data storage and generating an evaluation result, wherein a match between the determined key device address and any of the wireless communication addresses stored in the data storage is a requisite for a positive evaluation result; and means for unlocking said lock if a positive evaluation result is generated.

What is claimed is:

1. A lock actuating device for a lock mechanism of a lock, the lock actuating device comprising:

a transceiver configured to interact with a wireless key device, a controller coupled to the transceiver and configured to generate a control signal, said controller having a sleep mode and an operational mode, a lock actuator configured to actuate the lock mechanism upon receipt of the control signal from the controller, and a wake-up arrangement including a sensor and associated circuitry, the sensor being positioned to detect the presence of a user in a vicinity of the lock actuating device, and the circuitry being adapted to generate a wake-up control signal to the controller upon detection of said user, so as to cause the controller to switch from sleep mode to operational mode, wherein the controller is further configured to:

determine and evaluate a wireless communication address of the key device, prior to establishing a wireless communication link between the key device and the lock device, to provide an evaluation result;

depending on said evaluation result, establish the wireless communication link and receive verification data from the key device via said transceiver over said wireless communication link, wherein said verification data represents input made by the user by means of the key device; and decide whether to cause unlocking of said lock based on said evaluation of said wireless communication address as well as authentication of said verification data received.

2. A lock actuating device according to claim 1, said lock actuating device being mounted to a door having a door handle, wherein said sensor is positioned on or at said door handle and is adapted to generate said detection signal by electrically detecting interaction from said user on said door handle.

3. A lock actuating device according to claim 1, said lock actuating device being mounted to a door, wherein said sensor comprises a door bell button switch.

4. A lock actuating device according to claim 1, wherein said sensor is selected from the group consisting of: an IR (Infra-Red) sensor, an ultra-sound sensor, an optical sensor, an RF (Radio Frequency) sensor, a pressure sensor, a capacitive sensor, an acoustic sensor or a vibration sensor.

5. A lock actuating device according to claim 1, wherein said sensor is an RF (Radio Frequency) sensor adapted to detect mobile telecommunications traffic to or from a mobile terminal which implements said wireless key device.

6. A lock actuating device according to claim 1, said lock actuating device being mounted to a door, wherein said sensor is a pressure sensor which is located at floor level near said door, so as to detect pressure variations caused by said user when stepping on the floor.

7. A lock actuating device according to claim 1, said lock actuating device being mounted to a door having a door leaf, wherein said sensor is an acoustic sensor or vibration sensor which is adapted to detect door knocks on said door leaf.

8. A lock actuating device according to claim 7, wherein the circuitry of said wake-up arrangement is programmed or designed to apply predetermined wake-up criteria when deciding whether or not to generate said wake-up control signal, and wherein said wake-up criteria include at least one of the detection of more than one door knock within a certain time frame, and a given sequence of short and long door knocks.

9. A lock actuating device according to claim 1, wherein the controller puts itself in sleep mode after a certain period of inactivity.

10. A lock actuating device according to claim 1, wherein said transceiver complies with a communication standard for short-range wireless data communication.

11. A lock actuating device according to claim 1, wherein said sensor is excluded from the group consisting of a doppler sensor, a volumetric sensor and an infrared sensor.

12. A lock actuating device according to claim 1, wherein said wireless communication address of the key device, which is determined and evaluated prior to establishing said wireless communication link, also represents said key device when establishing said wireless communication link between the key device and the lock device, and when receiving said verification data from the key device.

13. A lock actuating device according to claim 1, the lock actuating device further comprising a local data storage, wherein the controller is further configured to:

determine and evaluate the wireless communication address of said key device by reference to a number of wireless communication addresses stored in said local data storage.

14. A lock actuating device according to claim 1, wherein said verification data represents input made by the user in the form of a PIN code entered by the user on a keypad of said key device.

15. A method of providing wireless control of a lock, the method involving:

providing a battery-powered, wirelessly controllable lock device as a stand-alone installation at a lock;

operating said lock device in a sleep mode with negligible power consumption during periods of inactivity;

detecting the presence of a user in a vicinity of said lock device;

in response to said detecting, exiting the sleep mode and entering an operational mode for said lock device; and in said operational mode, interacting with a wireless key device within operative range of said lock device to cause unlocking of said lock by:

determining and evaluating a wireless communication address of the key device, prior to establishing a wireless communication link between the key device and the lock device, to provide an evaluation result;

depending on said evaluation result, establishing said wireless communication link and receiving verification data from the key device over said wireless communication link, wherein said verification data represents input made by the user by means of the key device; and deciding whether to cause unlocking of said lock based on evaluation of said wireless communication address as well as authentication of said verification data received.

16. A method of providing wireless control of a lock according to claim 15, wherein detecting the presence of the user includes receiving a signal from a sensor and the signal is not from a sensor from a group consisting of a doppler sensor, a volumetric sensor and an infrared sensor.

17. A method of providing wireless control of a lock according to claim 15, wherein the communication address of the key device, which is determined and evaluated prior to establishing said wireless communication link, is also determined to represent said key device when establishing said wireless communication link between the key device and the lock device, and when receiving said verification data from the key device.

18. A method of providing wireless control of a lock according to claim 15, wherein the determining and evaluating of the wireless communication address of said key device includes determining and evaluating of the wireless communication address of said key device by reference to a number of wireless communication addresses stored in a local data storage.

19. A method of providing wireless control of a lock according to claim 15, further including verifying data that represents input made by the user in the form of a PIN code entered by the user on a keypad of said key device.

* * * * *